(12) United States Patent
Olsen, Jr.

(10) Patent No.: US 12,514,245 B2
(45) Date of Patent: Jan. 6, 2026

(54) MECHANICAL HUNTING TREE STAND LIFT

(71) Applicant: Christofer Olsen, Jr., Sterling Heights, MI (US)

(72) Inventor: Christofer Olsen, Jr., Sterling Heights, MI (US)

( * ) Notice: Subject to any disclaimer, the term of this patent is extended or adjusted under 35 U.S.C. 154(b) by 931 days.

(21) Appl. No.: 17/725,809

(22) Filed: Apr. 21, 2022

(65) Prior Publication Data

US 2022/0346367 A1  Nov. 3, 2022

Related U.S. Application Data (60) Provisional application No. 63/183,611, filed on May 3, 2021.

(51) Int. Cl.
*A01M 31/00* (2006.01)
*A01M 31/02* (2006.01)

(52) U.S. Cl.
CPC .................................. *A01M 31/02* (2013.01)

(58) Field of Classification Search
CPC ....... A01M 31/02; A01M 31/025; E06C 1/34; E06C 1/39; E06C 5/04; E06C 7/16; B66F 11/04; E04H 15/001; A63B 27/00; E04G 3/32; E04G 2003/286
USPC .......................................... 182/116, 141, 187
See application file for complete search history.

(56) References Cited

U.S. PATENT DOCUMENTS

| | | | | |
|---|---|---|---|---|
| 312,874 A * | 2/1885 | Ludwig | ................... | B66B 17/12 187/405 |
| 473,572 A * | 4/1892 | Gunnarson | ............... | E04G 1/22 187/343 |
| 687,126 A * | 11/1901 | Cease | ....................... | E04G 1/22 182/141 |
| 776,609 A * | 12/1904 | Miracle | ................... | B66F 11/04 187/347 |
| 979,900 A * | 12/1910 | Stuart | ....................... | E04G 1/22 187/407 |
| 1,392,660 A * | 10/1921 | Sebestakowicz | ........ | A62B 1/02 182/141 |
| 1,634,585 A * | 7/1927 | Kreider | ..................... | B66B 9/00 187/379 |
| 3,517,774 A * | 6/1970 | Meyer | ..................... | B66B 7/022 187/349 |
| 3,672,471 A * | 6/1972 | Badding | ................... | B66B 9/00 187/378 |
| 3,951,236 A * | 4/1976 | Schreiber | ................ | B66B 9/187 187/349 |
| 4,411,335 A | 10/1983 | Forrester | | |

(Continued)

FOREIGN PATENT DOCUMENTS

EP      1277495 A1 *  1/2003  ............. E06C 7/186

*Primary Examiner* — Ryan D Kwiecinski
(74) *Attorney, Agent, or Firm* — Harness, Dickey & Pierce, P.L.C.; Ryan W. Massey (57) ABSTRACT

A mechanical tree stand includes a vertical guide rail configured to be mounted to a tree. A trolley having a plurality of wheels is mounted to the vertical guide rail to traverse vertically up and down the vertical guide rail. A counterweight guide system includes at least one pulley mounted at a top of the single vertical guide rail. A cable has a first end connected to the trolley and a second end connected to a counterweight, the cable further engaging the at least one pulley. A platform is mounted to the trolley.

20 Claims, 9 Drawing Sheets

(56) References Cited

U.S. PATENT DOCUMENTS

| | | | | |
|---|---|---|---|---|
| 5,595,265 | A * | 1/1997 | Lebrocquy | A01M 31/02 187/244 |
| 5,862,827 | A * | 1/1999 | Howze | E04H 15/001 135/900 |
| 5,927,440 | A * | 7/1999 | Freeman | B66B 9/16 187/270 |
| 6,095,284 | A * | 8/2000 | Smith | E06C 1/34 182/103 |
| 6,640,934 | B1 * | 11/2003 | Edwards | B66B 9/00 187/254 |
| 7,140,467 | B2 * | 11/2006 | Cook | B60R 3/005 182/141 |
| 7,823,694 | B2 * | 11/2010 | Motes | A01M 31/02 182/187 |
| 7,909,139 | B2 * | 3/2011 | Blue | A01M 31/02 182/103 |
| 9,717,232 | B1 * | 8/2017 | Abouelmakarem | A01M 31/02 |
| 10,159,242 | B2 * | 12/2018 | Abouelmakarem | A01M 31/02 |
| 10,492,486 | B1 * | 12/2019 | Hayes | E04H 15/001 |
| 11,311,779 | B2 * | 4/2022 | Hines | A01M 31/02 |
| 2004/0140157 | A1 * | 7/2004 | Undi | A01M 31/025 182/187 |
| 2007/0095611 | A1 * | 5/2007 | Oertwig | A01M 31/02 182/142 |
| 2007/0169996 | A1 * | 7/2007 | Blue | A01M 31/02 182/141 |
| 2007/0256892 | A1 * | 11/2007 | Breedlove, Sr. | E06C 1/34 182/116 |
| 2008/0271948 | A1 * | 11/2008 | Motes | A01M 31/02 182/141 |
| 2018/0055040 | A1 * | 3/2018 | Abouelmakarem | A61G 5/104 |
| 2022/0346367 | A1 * | 11/2022 | Olsen, Jr. | A01M 31/02 |
| 2022/0364376 | A1 * | 11/2022 | Bouchard | B66D 1/12 |

* cited by examiner

MECHANICAL HUNTING TREE STAND LIFT

CROSS-REFERENCE TO RELATED APPLICATIONS

This application claims the benefit of U.S. Provisional Application No. 63/183,611, filed on May 3, 2021. The entire disclosure of the above application is incorporated herein by reference.

FIELD

The present disclosure relates to a hunting tree stand and more particularly to a hunting tree stand with improved and quieter operation.

BACKGROUND AND SUMMARY

Hunters often use tree stands for hunting for a long time. The tree stands have taken on many forms including ladders that require a user to climb up the tree. A problem with the ladders is that by the time the user gets their equipment to their tree stand, they can expend a lot of time and energy and they can work up a sweat that can lead to chills in cold temperatures. Alternative approaches have been proposed including machines that carry the hunter up the tree. However, the machines can make a lot of noise that can scare away any game that is in area. Accordingly, it is desirable to provide a tree stand lift that is easy to use and quiet.

A mechanical tree stand according to the present disclosure includes a vertical guide rail configured to be mounted to a tree. A trolley having a plurality of wheels is mounted to the vertical guide rail to traverse vertically up and down the vertical guide rail. A counterweight guide system includes at least one pulley mounted at a top of the single vertical guide rail. A cable has a first end connected to the trolley and a second end connected to a counterweight, the cable further engaging the at least one pulley. A platform is mounted to the trolley.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
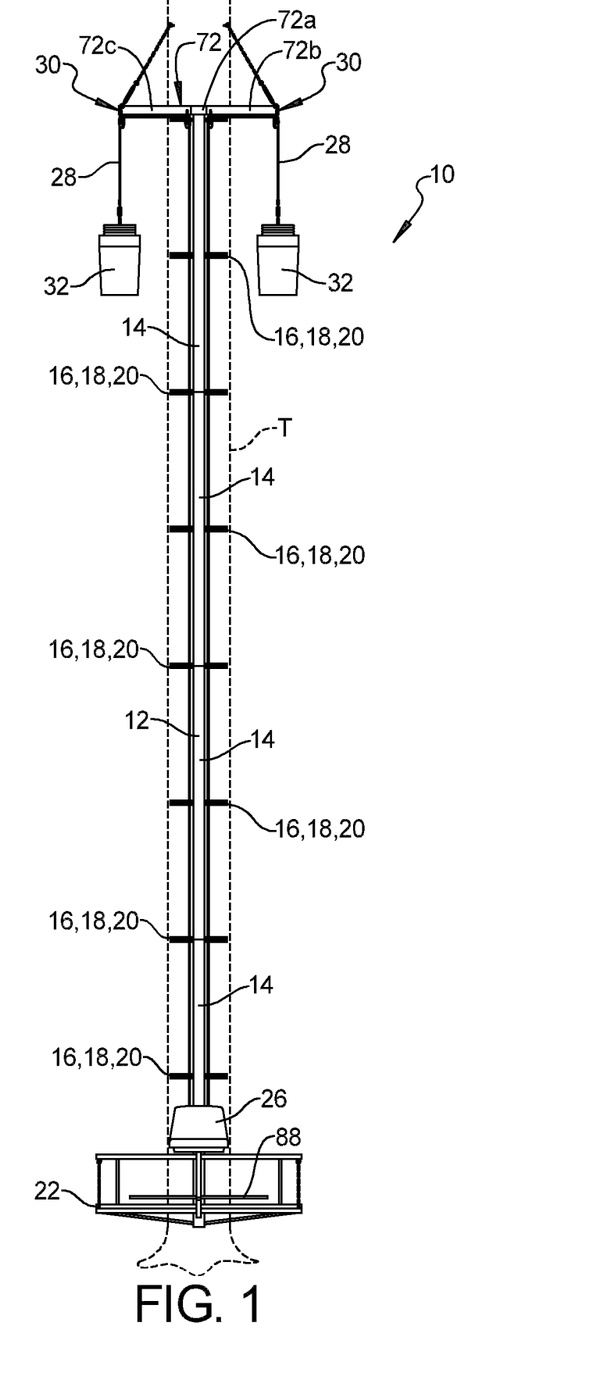
FIG. 1 is a front plan view of the mechanical hunting tree stand lift mounted to a tree according to the principles of the present disclosure.
Figure 3:
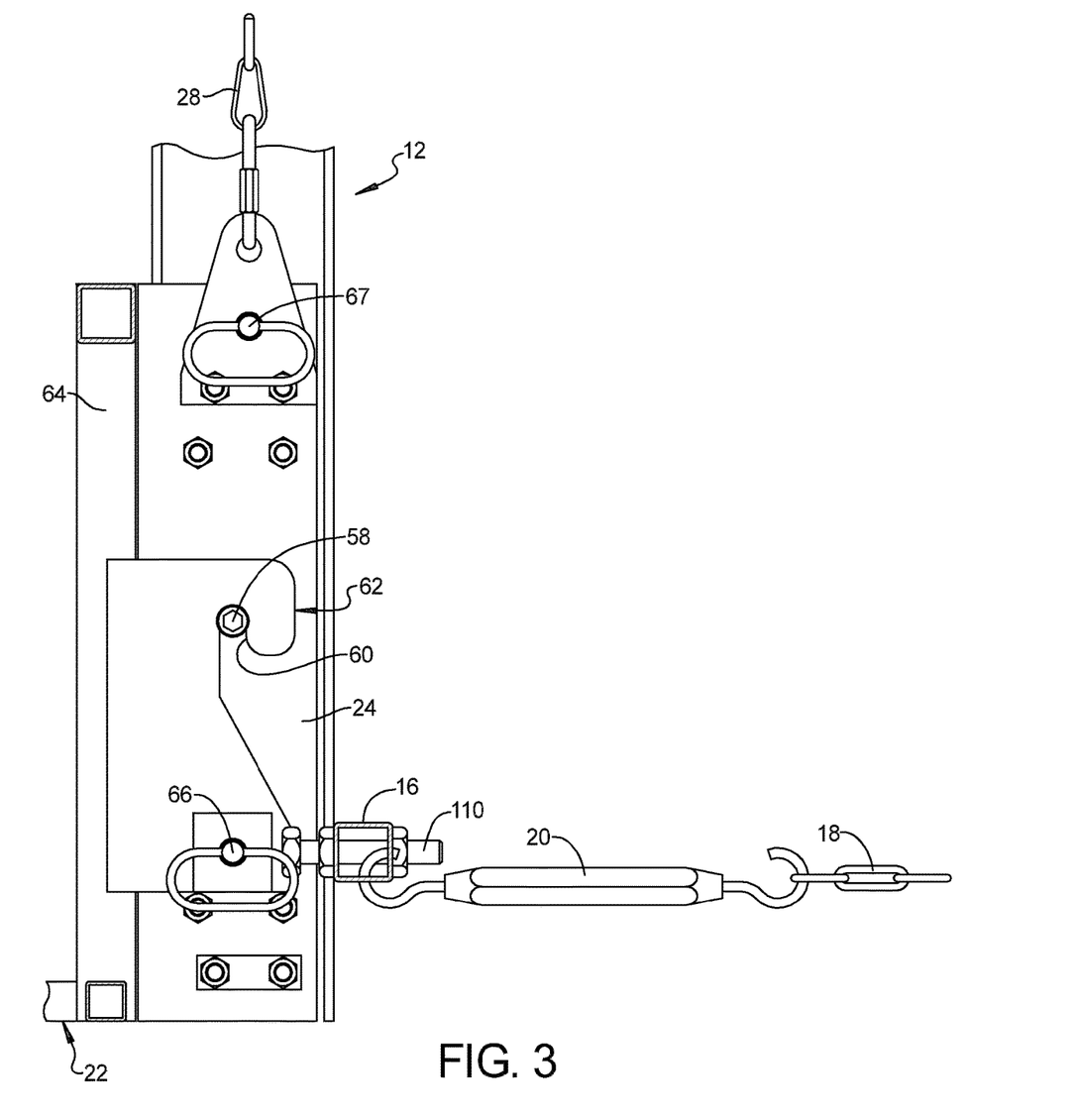
FIG. 3 is a side plan view of the platform mounted to the trolley and showing a chain and turnbuckle system for mounting the rail system to a tree.
Figure 7:
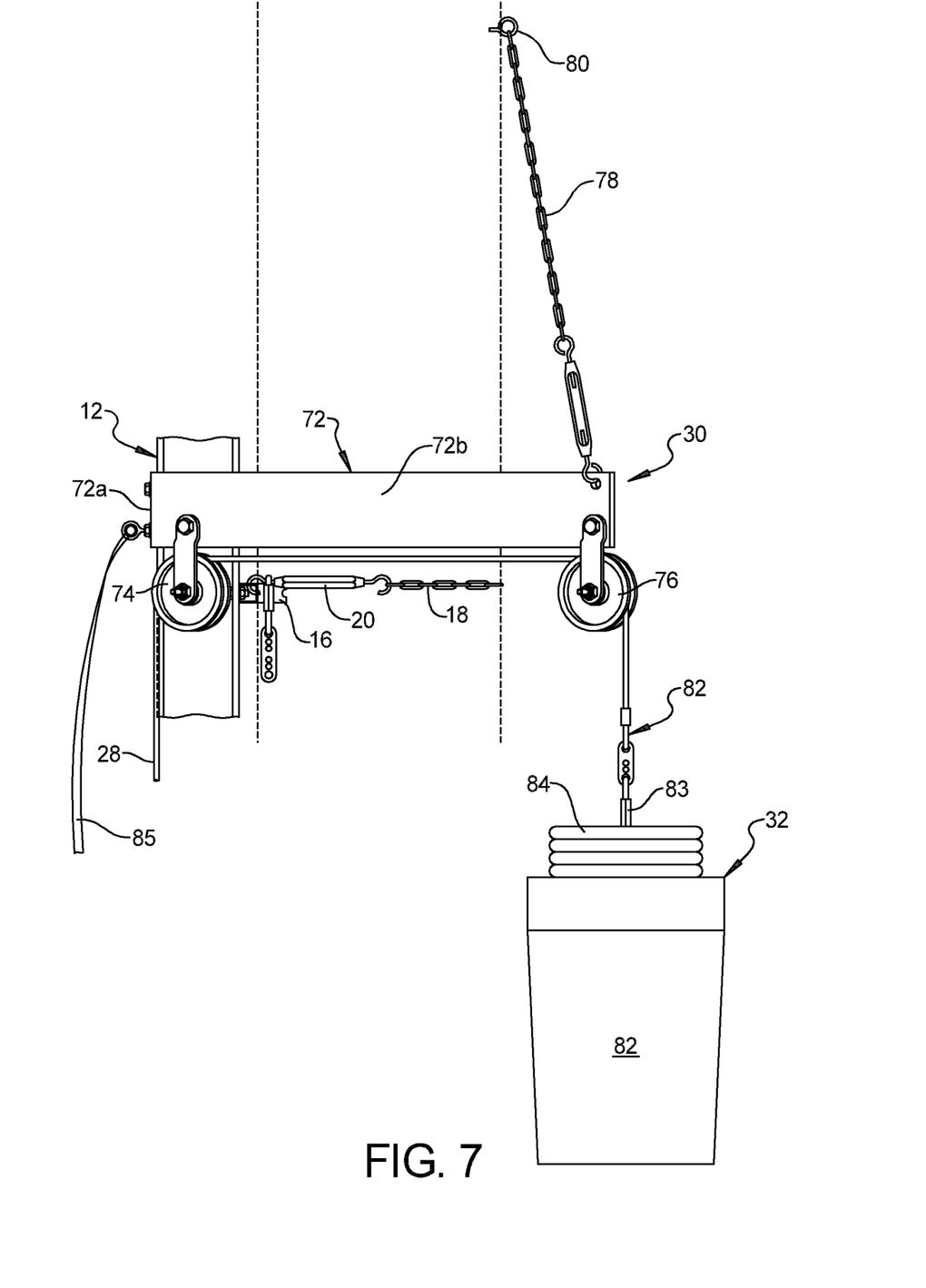
FIG. 7 is a side plan view of a counterweight supported by the counterweight v-frame pulley system.

With reference to FIG. 1, a mechanical hunting tree stand lift/elevator 10 according to the principles of the present disclosure will now be described. The mechanical hunting tree stand lift/elevator 10 includes a rail system 12 that can be made from a series of I-beams 14 that are linked/connected end to end and are secured to the tree T by a series of tree mounting brackets 16 that are fastened to the I-beams 14 and are attached to the tree by a chain 18 and turnbuckle system 20 that wrap around the tree trunk, as shown in FIGS. 1, 3 and 7.

By way of non-limiting example, four six-foot long I-beam sections 14 can be used to create a 24 foot high rail system 12. Additional or fewer, longer, or shorter, I-beam sections 14 could be used depending upon a desired height of the rail system 12. A user/hunter platform 22 is guided upwardly along the rail system 12 and is connected to a pair of cables 28 that engage a V-fame pulley system 30 and are further connected to a pair of counterweights 32. The user/hunter platform 22 can include a 360 degree adjustable height pivoting seat 26 securely mounted to the user/hunter platform 22.

Figure 2:
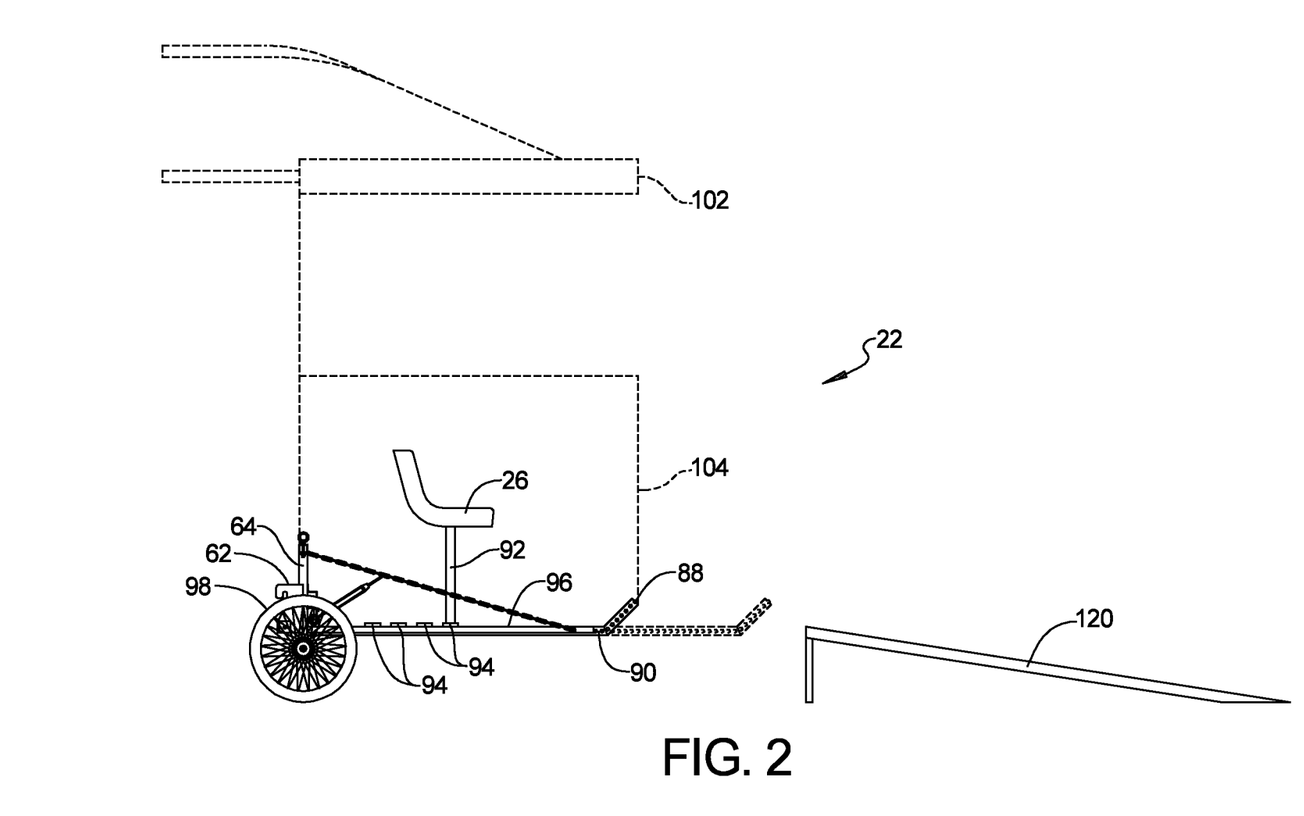
FIG. 2 is a side plan view of the hunter/user platform mounted to the rail system and with a camouflage basket and umbrella coverage for rain or snow.

As shown in FIG. 2, the seat 26 is provided on an adjustable height seat post 92 which can be received in one of various holes 94 provided in a floor 96 of the platform 22. The various holes 94 allow the seat location to be adjusted in the fore/aft direction. The floor 96 of the user/hunter lifting platform 22 can be formed from a metal frame structure and an expanded metal mesh to allow for water and snow to pass therethrough. Additional mats or coverings can be placed on top of the expanded metal mesh floor 96 as a wind blocker while using an optional canopy 102 and surround camo basket set up 104, as seen in FIG. 2.

As shown in FIG. 2, the user/hunter lifting platform 22 is provided with a pair of spoked wheels 98 and a footrest 88 that is supported by the telescoping support shaft 90. The footrest 88 includes an elongated horizontal rail that also serves as a handle to allow the user/hunter platform 22 to be converted and operate as a game hauling cart that can be easily used for transporting expired game out of the woods. In addition, the platform/cart 22 can also be attached to an ORV (Off Road Vehicle) hitch. The footrest/cart handle 88 is also provided for the user's feet and can be adjusted inwardly and outwardly by a telescoping support shaft 90 that is supported by an inside center frame of the user/hunter platform 22. The telescoping support shaft 90 is provided with a plurality of holes that can receive a locking pin for locking in the position of the telescoping support shaft 90 relative to the center frame of the user/hunter platform 22

The platform 22 further includes a rear mounting frame 64 and mounting bracket 62, best shown in FIG. 3. The mounting brackets 62 can be welded to the frame member 64 of the user/hunter platform 22.

Figure 4:
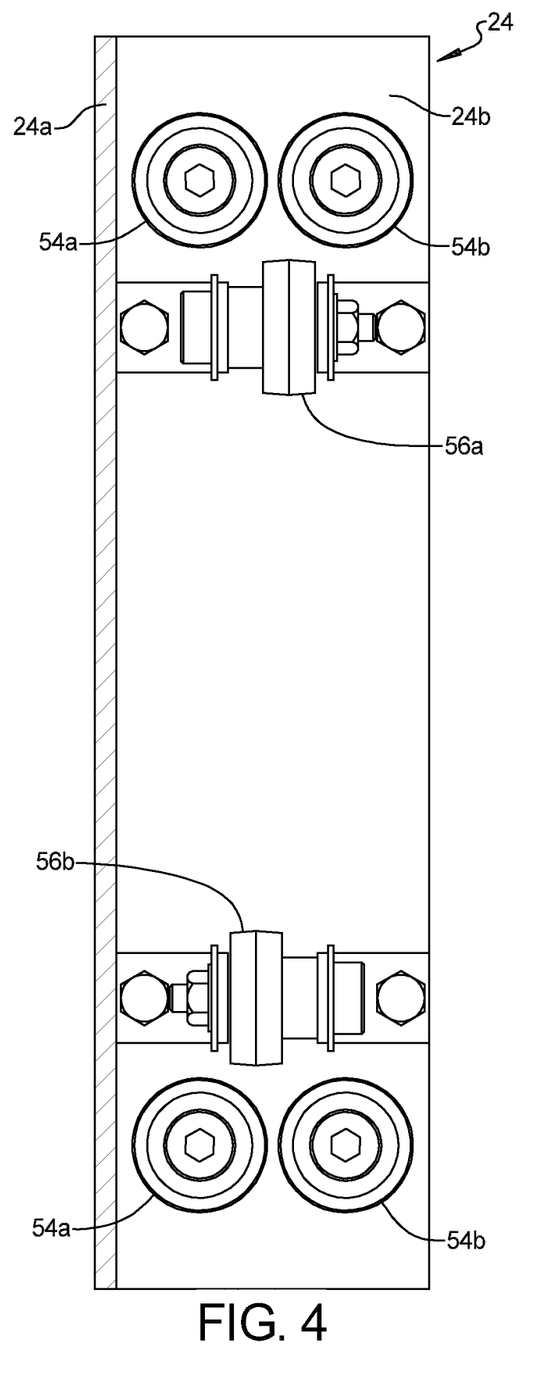
FIG. 4 is a detailed cross sectional view of the trolley and illustrating a bearing assembly on one side of the trolley.
Figure 5:
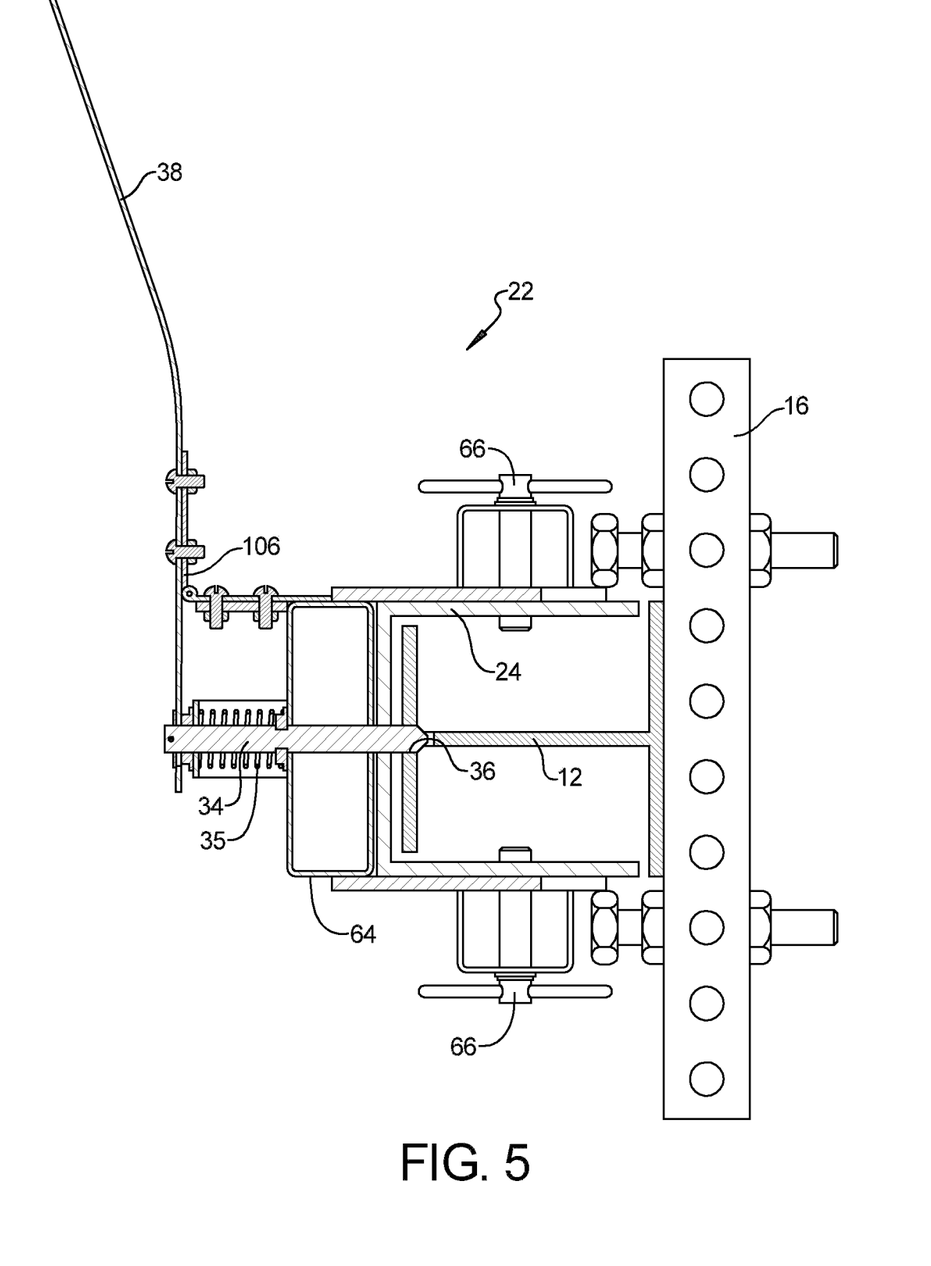
FIG. 5 is a cross-sectional view of a foot levered safety locking pin engagement system in an engaged position.

With reference to FIGS. 3-5, the mounting bracket 62 of the platform 22 has a C-shaped cross section and is releasably connected to a trolley 24 that travels up and down the rail system 12. The trolley includes a pair of mounting pins 58 on opposite sides (only one of which is shown in FIG. 3)

and the mounting bracket 64 includes a pair of engagement hooks 60 that engage the pair of mounting pins therein, as shown in FIG. 3. A pair of locking pins 66 can be used to secure the mounting bracket 62 to the trolley 24.

With reference to FIG. 3, the adjustable tree mounting brackets 16 are mounted/fastened to the rear flange of the guide rail 12 and includes adjustable mounting bolts 110 which are threaded through the opposite ends of the tree mounting brackets 16 to engage the surface of the tree allowing for adjustment and alignment/leveling of the rail system 12 relative to the surface of the tree. The threaded bolts 110 can be provided with enlarged heads or padded heads for contacting the tree without damaging it, while a hex head can also be provided for manipulating the bolts 110 with an adjustment tool.

As shown in the cross-sectional view of FIG. 4, each side of the trolley 24 includes a series of inner roller bearings 54a, 54b that engage an interior surface of the opposing flanges of the I-beam guide rail 12 and a pair of roller bearings 56a, 56b that engage the center web section of the I-beam guide rail 12. The trolley 24 has a C-shaped cross-section and straddles the front flange I-beams 14 while the roller bearings 54a, 54b and 56a, 56b are secured to the inner side walls 24a and 24b of the trolley 24. With each side of the 24 having roller bearings 54a, 54b, 56a, 56b engaging opposite sides of the guide rail 12, the trolley securely travels up and down the guide rail 12. With returning reference to FIG. 3, the trolley 24 is connected to the pair of galvanized coated wire cables 28 (only one of which is shown in the side view of FIG. 3) which travel upward through the V-frame pulley system 30 and connect to the counterweights 32. The wire cables 28 each support two adjustable counterweights 32 that are designed to counter the weight of the user/hunter platform 22 plus the trolley 24 and the weight of the hunter/user and gear.

Figure 6:
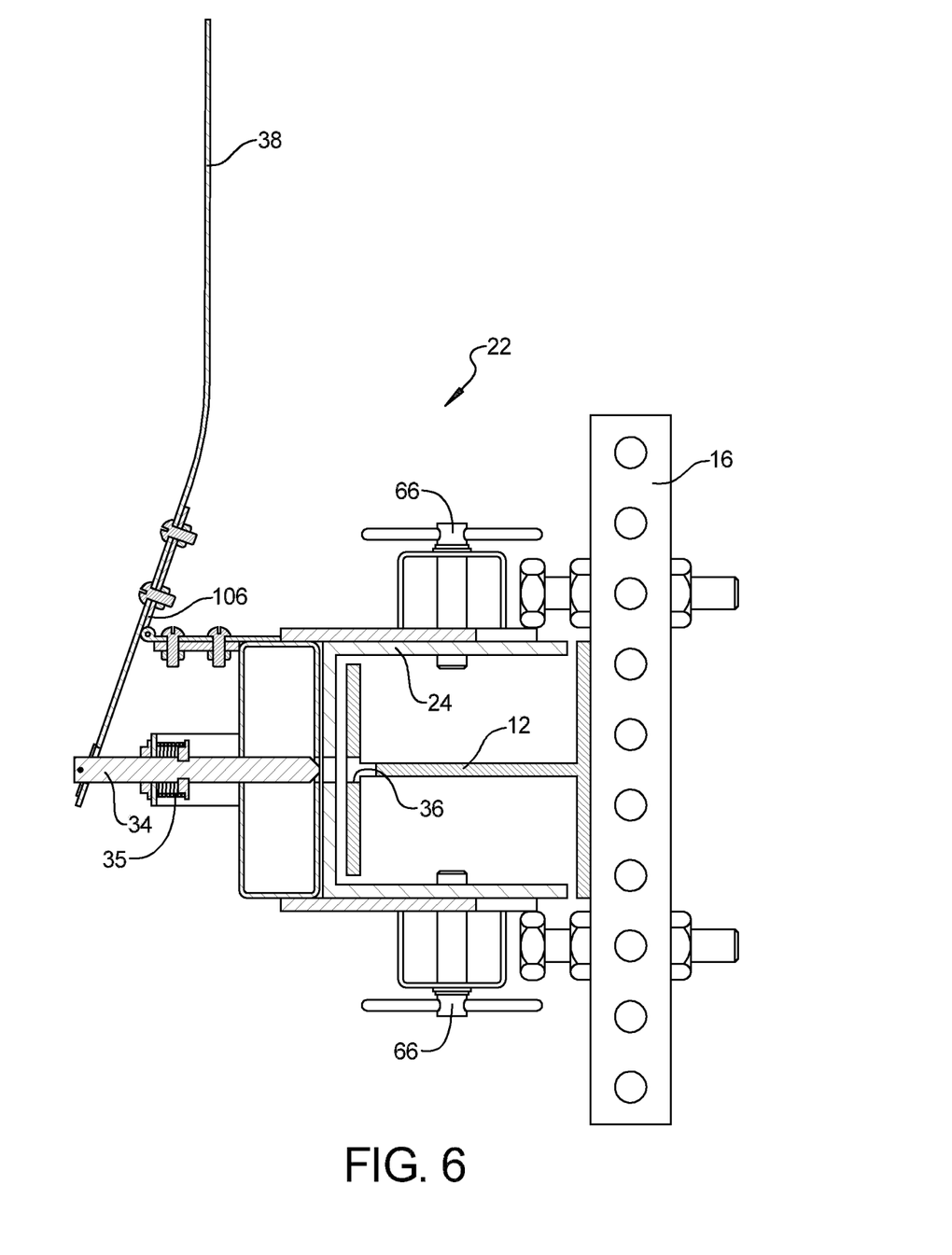
FIG. 6 is a cross-sectional view of a foot lever safety locking pin engagement system in a disengaged position.
Figure 8:
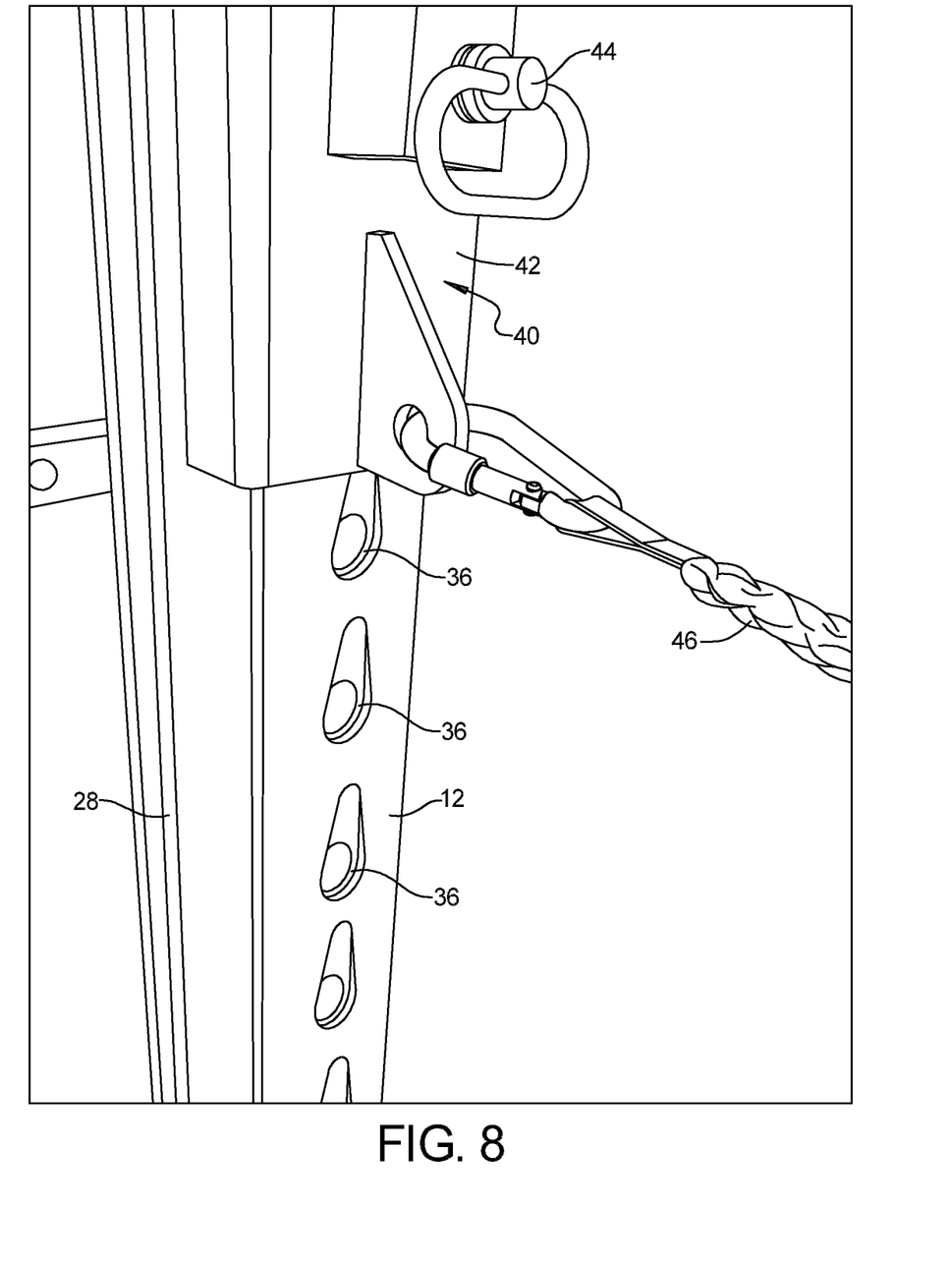
FIG. 8 is a front perspective view of a tether connection safety locking pin slide restraint system of the hunting tree stand lift.

As best shown in FIG. 8, the guide rail 12 is provided with a series of engagement holes 36 that can extend along the entire guide rail 12. With reference to FIGS. 5 and 6, the engagement holes 36 are engageable by a stop pin 34 mounted on the frame 64 of the user/hunter platform 22. The stop pin 34 is biased toward an engaged position as shown in FIG. 5 by a spring 35. The stop pin 34 is connected to a foot operated lever arm 38 that is connected to the frame 64 by a hinge 106. The lever arm 38 can be mounted above the floor 96 of the platform 22 to be easily engaged by a user/hunter's foot to move the stop pin 34 to a disengaged position as shown in FIG. 6 where the stop pin 34 is removed from the engagement holes 36 in the guide rail 12. It should be noted that during operation of the hunting tree stand 10, the weight of the user/hunter lifting platform 22 and weight of the user/hunter is always equally counterbalanced by the counterweights 32 so that a disengagement of the stop pin 34 from the engagement holes 36 in the rail system 12 merely allow the lifting platform 22 to generally free float up and down the guide rail 12 with very little manual lifting or pushing effort.

Figure 9:
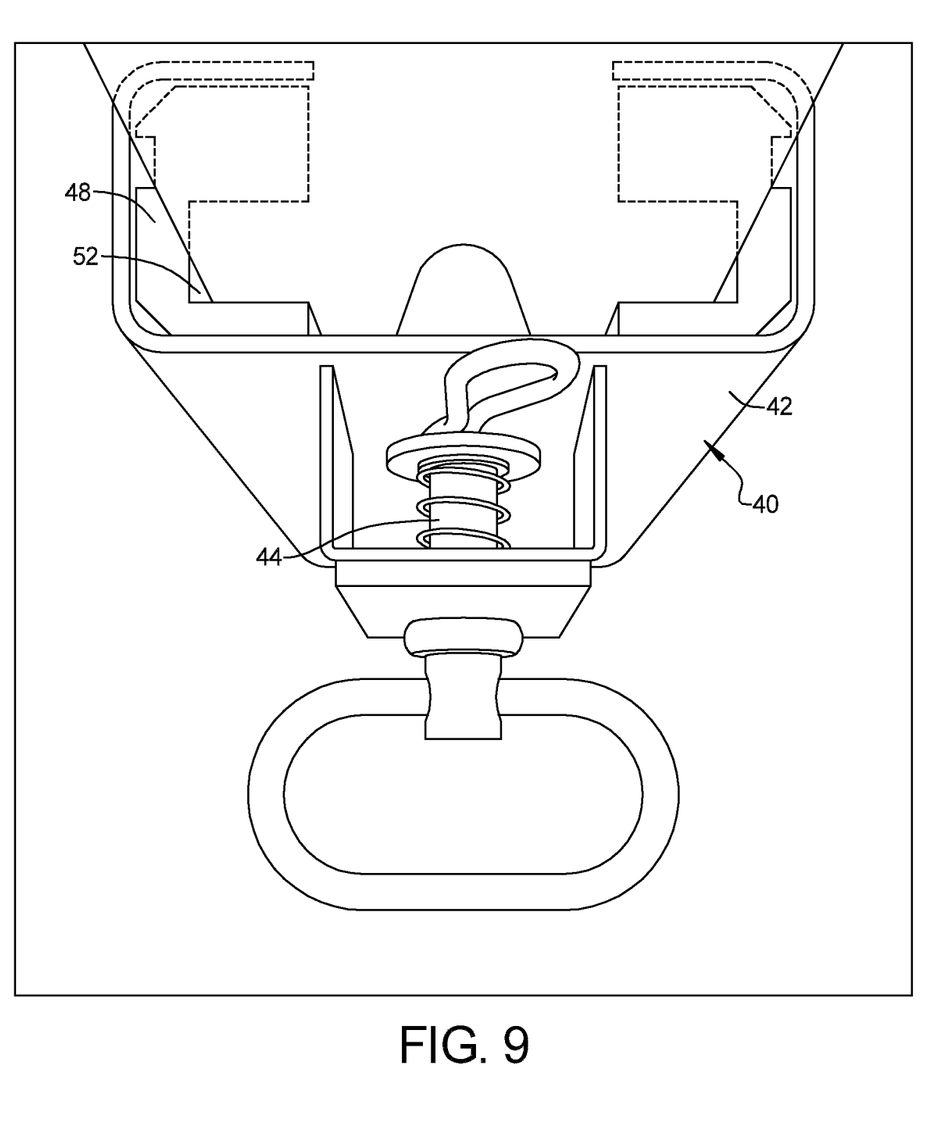
FIG. 9 shows a further detailed top view of the tether connection safety locking pin slide restraint system having inner nylon glide sleeve bearing inserts.

An additional upper safety tether slide locking mechanism 40 is provided on the guide rail 12 as illustrated in FIGS. 8 and 9. The safety tether slide locking mechanism 40 includes a C-channel bracket 42 supporting a spring biased engagement safety locking pin 44 (best shown in FIG. 9) that engages into the locking engagement holes 36 in the guide rail 12. The safety tether slide locking mechanism 40 is designed to be clipped onto by a tether 46 of a user's safety body restraint harness as shown in FIG. 8. The safety body restraint harnesses of the type utilized are well-known in the art and are commercially available and should always be worn during operation of the mechanical tree stand lift 10. The C-channel slide bracket 42 supports an inner nylon bearing slide insert members 48 that can be fastened to the inner C-channel slide bracket 42 by screw fasteners. The nylon slide bearing insert members 48 define a smaller C-channel sliding grove 52 to provide a smooth quiet sliding surface that rides along the forward flange side edge of the I-beam rail sections 14. During operation, with the safety fall body restraint harness tether 46 connected to the safety fall tether slide locking mechanism 40 the user/hunter is prevented from falling to the ground while traversing up and down the tree stand lift 10, the user would pull the spring biased safety locking pin 44 out of engagement from the engagement holes 36 in the rail system 12 so that the safety fall tether slide locking mechanism 40 can slide freely up and down the guide rail 12 in sync with the user/hunter platform 22.

FIG. 3 also shows a safety lock out pin 67 that is received through the side of the trolley 24 and through the center web of the bottom I-beam 14 to lockout and disable the trolley from any movement 24 in a safe stationary parked position locked into the center web hole of the rail system 12 for when the hunter/user platform 22 is being separated to be used as an expired game hauling cart.

FIG. 7 shows one side of the counterweight V-frame pulley system 30 on which the wire cables 28 travel through. The wire cables 28 are connected to the top of the trolley 24 at one end and to the eye bolt 82 of the counterweight 32 at its opposite end. The pulley system includes a V-shaped frame 72 that has a front base portion 72a that is fastened with 4 bolts to the top of the guide rail 12. As illustrated, a first pair of proximal pulleys 74 are mounted near the front base 72a of the counterweight V-frame system 72. A second pair of rear pulleys 76 are mounted to the distal ends of the arms 72b, 72c of the counterweight V-frame system 72. A chain 78 can be connected to the top distal ends of the arms 72b, 72c of the counterweight V-frame 72 and the opposite end of the chain 78 can be connected to an eyebolt screw 80 that is screwed into the tree as shown. The counterweights 32 as shown in FIG. 7 can include a 5 gallon bucket 82 that has been filled with cement. According to one embodiment, a threaded lifting rod system 83 is embedded within the cement and extends out of the cement for connection an eye bolt 82 connected to the end loop of the wire cables 28. In addition, disc-style weights or other style plate weights 84 can be added to each counterweight 32 to precisely counterbalance the weight of the user/hunting platform 22, the trolley 24 and the weight of a specific user/hunter and all gear. It is anticipated that the counterweights are designed to be only slightly less than the weight of the user/hunter lifting platform 22 and all of its contents so when lifting/pulling up the rail system 12 takes less than 10 pounds of lifting force allowing the user/hunter to slowly float down the mechanical tree stand 10 after disengaging/releasing the safety lever locking pin 34.

With reference to FIG. 7, a rope or strap 85 can be mounted to the top of the rail system 12 to allow a user/hunter quietly and easily pull themselves up the rail system 12 or to slowly lower themselves down the rail system 12. When the user is fully up the rail system 12, the user releases the safety foot lever 38 (shown in FIGS. 5 and 6) so that the spring biased safety stop pin 34 automatically engages into one of the engagement holes 36 in the guide rail 12 and safely locks the user/hunter platform 22 in place and secure into a hunting position. In addition, the user also releases the engagement pin 44 of the safety tether restraint slide mechanism 40 so that it engages in one of the engagement holes 36 in the guide rail 12 safely locking it in place to the I-beam engagement holes 36, with the tether attached 46 once again securing the hunter from falling off the platform.

The I-beams sections 14 are connected end to end with slip pins through the top of the mounting brackets 16 that are bolted or otherwise fastened to the rear I-beam flange. Four flat head machine screws can extend through the front I-beam flange screwing into an I-beam bridging bracket.

In operation, a user/hunter can sit or stand on the lifting platform 22 and while disengaging a foot lever safety locking pin system 38 (described herein in greater detail), the user/hunter can pull themselves and the hunting lifting platform 22 up to the top of the rail system 12 while the counterweights 32 connected to the wire cables 28 and a counterweight V-frame pulley system 30 fully counterbalance the weight so that the user/hunter lifting platform 22 and user travel up and down the rail system 12 practically effortlessly, safely, and quietly. With the effortless, safe, and quiet lifting system, the user/hunter does not work up a sweat which can lead to frostbite on very cold days, also can eliminate falling injuries or death if used properly, and is less likely to scare off any prey/game in the hunting area.

Furthermore, the user/hunter platform 22 is also made large enough to receive a wheelchair with appropriate ramps 120 as shown in FIG. 2. The user/hunter lifting platform 22 also includes apertures for receiving branches or other camouflage cover systems. The user/hunter lifting platform 22 as depicted is large enough to receive a user's hunting gear as well as a small cooler or other accessories for their comfort. With the ease of traversing up-and-down the guide rail 12, the hunter is able to quietly, safely, and easily move up and down the tree, while other motorized systems would generate great noise that would possibly scare away any nearby prey/game. While other manual systems such as ladder stands or tree climbers would cause great inconvenience to the user, possibly causing fall injuries or death, and working up a sweat by wearing thick gear that can lead to frostbite when they re-take their position up the tree.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A mechanical tree stand, comprising:
   a singular vertical guide rail configured to be mounted to a tree;
   a trolley having a plurality of wheels mounted to the singular vertical guide rail to traverse vertically up and down the singular vertical guide rail;
   a counterweight guide system including at least one pulley mounted at a top of the singular vertical guide rail;
   a cable having a first end connected to the trolley and a second end connected to a counterweight, the cable engaging the at least one pulley, wherein the counterweight moves vertically down when the trolley traverses vertically up the singular vertical guard rail and the counterweight moves vertically up when the trolley traverses vertically down the singular vertical guard rail;
   a platform mounted to the trolley.

2. The mechanical tree stand according to claim 1, wherein the platform is removably mounted to the trolley.

3. The mechanical tree stand according to claim 1, wherein the platform includes a pair of wheels and a pull handle mounted thereto.

4. The mechanical tree stand according to claim 1, further comprising a rain covering mounted to the platform.

5. The mechanical tree stand according to claim 1, further comprising a seat mounted to the platform.

6. The mechanical tree stand according to claim 1, further comprising a locking pin mounted to the platform for releasably engaging a plurality of apertures in the guide rail for securing the trolley and platform at different locations along the guide rail.

7. The mechanical tree stand according to claim 1, wherein the guide rail has an I-beam cross-section.

8. The mechanical tree stand according to claim 7, wherein the trolley includes a plurality of wheels that engage the vertical guide rail.

9. The mechanical tree stand according to claim 1, wherein the platform is releasably connected to the trolley.

10. The mechanical tree stand according to claim 1, further comprising a safety tether slide engaged with the guide rail and configured to connect to a safety tether worn and body harness worn by a user, the safety tether slide including a locking pin that engages a plurality of apertures in the guide rail.

11. The mechanical tree stand according to claim 10, wherein the safety tether slide includes a nylon guide sleeve.

12. The mechanical tree stand according to claim 1, wherein the guide rail includes a plurality of guide rail segments stacked end to end and further comprising a plurality of mounting brackets mounted to the guide rail and a chain and turnbuckle associated with each mounting bracket for securing the guide rail to a tree.

13. The mechanical tree stand according to claim 12, wherein the plurality of mounting brackets have adjustable bolts that are configured to engage the tree.

14. The mechanical tree stand according to claim 1, wherein the trolley includes a removable lock pin for engaging the trolley to the guide rail.

15. A mechanical tree stand, comprising:
- a singular vertical guide rail configured to be mounted to a tree;
- a trolley having a plurality of wheels mounted to the singular vertical guide rail to traverse vertically up and down the singular vertical guide rail;
- a counterweight guide system including at least one pulley mounted at a top of the singular vertical guide rail;
- a cable having a first end connected to the trolley and a second end connected to a counterweight, the cable engaging the at least one pulley;
- a platform mounted to the trolley;
- a locking pin mounted to the platform for releasably engaging a plurality of apertures in the guide rail for securing the trolley and platform at different locations along the guide rail; and
- a foot actuated lever engaged with the locking pin for disengaging the locking pin from engagement with the guide rail, wherein the foot actuated lever is configured to be engaged by a user's foot while on the platform.

16. The mechanical tree stand according to claim 15, wherein the locking pin is biased toward an engaged position by a spring.

17. A mechanical tree stand, comprising:
- a singular vertical guide rail configured to be mounted to a tree;
- a trolley having a plurality of wheels mounted to the vertical guide rail to traverse vertically up and down the singular vertical guide rail;
- a counterweight guide system including at least one pulley mounted at a top of the singular vertical guide rail;
- a cable having a first end connected to the trolley and a second end connected to a counterweight, the cable engaging the at least one pulley;
- a platform mounted to the trolley, wherein the counterweight guide system includes an arm mounted to a top of the guide rail and including the at least one pulley including a pair of pulleys with one of the pair of pulleys at each end of the arm wherein the cable engages the pair of pulleys.

18. The mechanical tree stand according to claim 17, wherein the counterweight guide system includes a pair of arms mounted at a top of the guide rail and wherein the pair of pulleys include two pairs of pulleys disposed at each end of the pair of arms, wherein the cable includes a pair of cables, each of the pair of cables engaging the pair of pulleys on a respective arm, each of the pairs of cables being connected to the trolley, the counterweight including a pair of counterweights each connected to a respective one of the pair of cables.

19. The mechanical tree stand according to claim 18, wherein the pair of arms define a V-shaped frame having a base section that is secured to the guide rail.

20. The mechanical tree stand according to claim 18, wherein the pair of arms are configured to be secured to the tree by a chain.

* * * * *